Patented Feb. 10, 1953

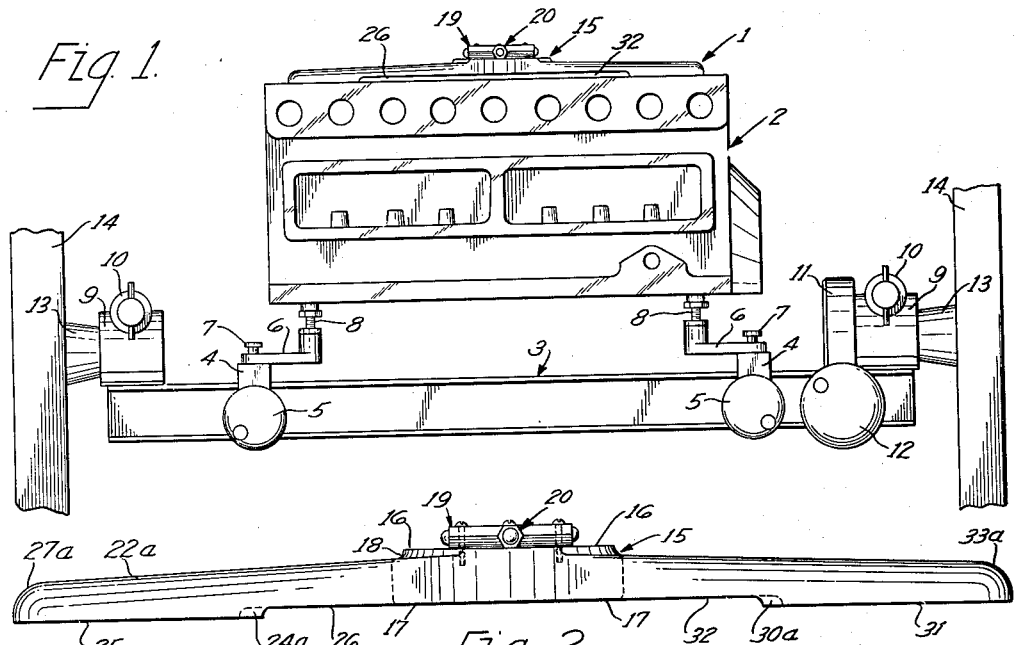
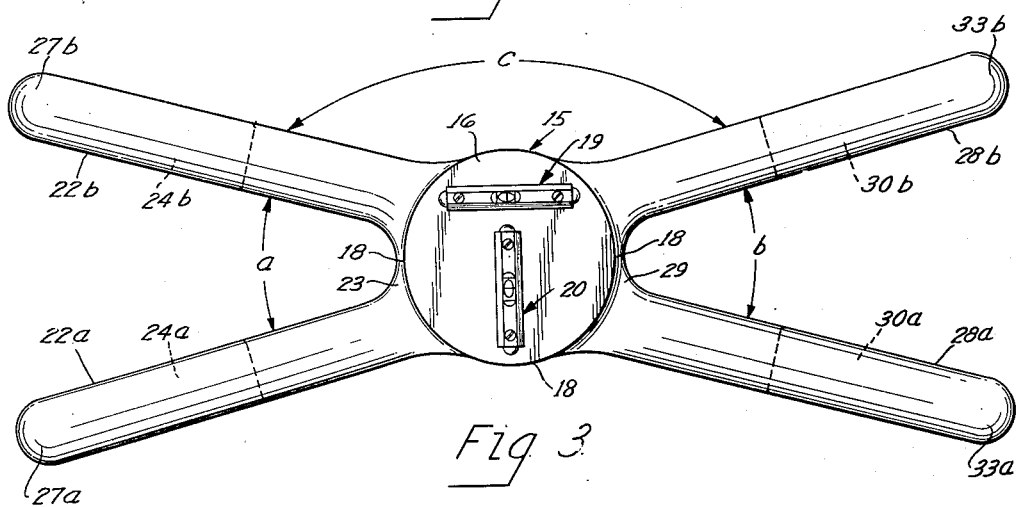
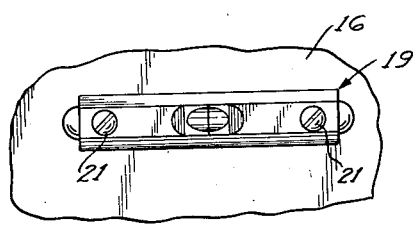

2,627,665

UNITED STATES PATENT OFFICE 2,627,665

LEVELING GAUGE

James J. Strnad, Bedford, Ohio, assignor to Lempco Products, Inc., Bedford, Ohio, a corporation of Ohio Application March 30, 1951, Serial No. 218,386

1 Claim. (Cl. 33—207)

This invention relates to methods of and means for leveling engine blocks, cylinder heads and like work pieces preparatory to grinding, regrinding or otherwise finishing the major surfaces thereof.

In regrinding the major surfaces of dismantled engine blocks, cylinder heads and like work pieces, difficulties in leveling the work piece in the grinding machine are frequently encountered as a result of the fact that the work piece has developed local distortions; e. g., convex warping of certain parts, such as the webs between cylinders in an engine block, that are located at or near the inner reaches of the work piece. If an ordinary level such as the mechanic's level is applied to the surface, such localized distortion may and frequently does make for inaccurate results in the sense that flatness measured over a warped area may give rise to a reground surface that is angled somewhat relative to the longitudinal and transverse axes of the work piece. A grind or cut that is excessive at one end or along one side or both can easily result from errors in leveling introduced by local distortions of this kind.

In the past, it has been necessary in using a mechanic's level to make a great many applications of the level to the surface of the work piece to determine the location and the effect on the leveling operation of such local distortions, which, although not readily discernible to the human eye, may nevertheless introduce significant errors. The present invention, which provides new methods of and means for leveling work pieces, has for its object to provide simple procedures and means whereby the work piece may be leveled on the basis of contact at a plurality of widely spaced areas around the periphery of the work piece. This the invention does, among other things, by providing a new type of flatness gauge, together with novel methods for its use, that will permit the machinist to level the work piece quickly and accurately without regard to convex warping at or near the center of the surface to which the level is applied.

For convenience, the invention is illustrated in the accompanying drawing in connection with a grinding machine provided with an adjustable work table on which the work piece, which is shown as taking the form of an engine block, is supported in a manner permitting it to be raised or lowered along one end, one side, or both. However, the invention is not limited to use in conjunction with a grinding machine or to application to an engine block mounted on the work table of a grinding machine, but is susceptible to many other applications that will suggest themselves to those skilled in the art. In particular, the flatness gauge which the invention provides may be used in circumstances having nothing to do with grinding operations but where, for one reason or another, it is desirable to make use of a flatness gauge which, as an incident to use, makes contact only at widely spaced areas with the object to which it is applied.

In such drawing, Figure 1 shows the flatness gauge of the present invention applied to the top surface of an engine block mounted for regrinding on the work table of a surface-grinding machine, the grinding wheel and certain other parts of the machine being omitted from the figure. Figure 2 is a side elevation of the flatness gauge of the invention in its preferred embodiment, the same being shown on a scale somewhat greater than that of Figure 1. Figure 3 is a corresponding top plan. Figure 4 is a fragmentary enlargement of part of the platform of the flatness gauge to illustrate in detail how the spirit levels are mounted on the upper face of the platform.

Figure 1 shows gauge 1 applied to the top surface of an engine block 2 mounted on work table 3 of a grinding machine. Work table 3 consists of a rectangular frame, seen only in side elevation, on which are mounted two transversely extending work clamp bars 4. The work clamp bars 4 are fastened to work table 3 by means of locating screws (not shown) of which the operating heads 5 appear in elevation. Suitably located in longitudinally extending slots in the work clamp bars 4 are four work-locating lugs 6, the latter being offset after the fashion of bell crank levers and being held in place on work clamp bars 4 by means of hold down screws 7. Adjustable studs 8 project upward out of the free ends of work-locating lugs 6. Studs 8 make it possible to locate engine block 2 on work table 3 without clamping it in position, although, if desired, it may be clamped or held by screws or the like directly to work clamp bars 4.

At the two opposed ends of work table 3 are mounting assemblies 9 which include rotary work table locks 10 for holding mounting assemblies 9 and therefore work table 3 in any desired angular position relative to the jack shafts (not shown) from which mounting assemblies 9 are supported. The mounting assembly at the right-hand end of work table 4 includes a worm and wheel assembly 11 to which is coupled a hand wheel 12. So long as rotary table locks 10 are not set to preclude adjustment, the angular position of work table 3 with respect to the horizontal axis of the jack shafts may be adjusted by rotating hand wheel 12. Shaft housings 13, which in Figure 1 conceal the jack shafts from view, are attached to slides (not shown) which operate vertically in frame 14 of the grinding machine in such manner that either slide alone or both together may be moved up or down, as desired. By means of the slides in frame 14, mounting assemblies 9, work-locating lugs 6 and studs 8, a high degree of flexibility of adjustment is provided, making it possible to effect with great ease such adjustments as may be indicated by gauge 1 as necessary or desirable.

As best appears from Figures 2 and 3, gauge 1 includes a central platform 15 which is generally cylindrical and which has a flap upper face portion 16, a flat lower face portion 17, and an intermediate edge portion 18. Mounted within the peripheral limits of upper face portion 16 are two spirit levels 19 and 20, the former extending longitudinally and the latter transversely of the gauge. Spirit level 19 is parallel to but offset laterally from the longitudinal central axis of the gauge and spirit level 20 is positioned in the vertical plane extending transversely to the longitudinal central axis of the gauge but is offset from a central position to a position closer to the near side of the gauge as seen in elevation in Fig. 2. Thus even though neither is centered on platform 15, the two spirit levels are nevertheless in parallelism with the principal axes of gauge 1. They are attached to platform 15 by means of screws 21, best seen in Figure 4, which are threaded into tapped holes in platform 15.

Extending to the left from central platform 15 as seen in Figures 2 and 3 is a plurality of sharply-diverging work-contacting legs, two in the embodiment shown, that are designated 22a and 22b. Legs 22a and 22b are joined at the crotch by a shallow yoke 23 that is formed integrally with intermediate edge portion 18 of platform 15. Depending from legs 22a and 22b near their respective ends are shallow work-contacting portions, 24a and 24b, of elongated shape. Each of the latter is provided on its lower surface with a plane work-contacting face, that on leg 22a appearing in Figure 2, wherein it is designated 25. As a result, a recess or relieved portion 26 is formed under leg 22a which extends under yoke 23 and platform 15. Such relieved portion provides a clearance adequate to accommodate convex deformations produced by warping near the center of engine block 2. A like end-construction and a like relieved portion characterize leg 22b. At their ends, two legs 22a and 22b have smoothly faired upper surfaces 27a and 27b.

Where only the two legs 22a and 22b make up the left-hand group of work-contacting legs, the angle a between them may vary within rather wide limits. In the preferred embodiment of the invention, illustrated in Figures 2 and 3, angle a is of the order of 30°; however, in a given case, it may be much more or much less. For example, angle a may be as much as or even more than 90°, although in the latter case it may be desirable to add a third leg (not shown) extending axially of the gauge between legs 22a and 22b. In any event, work-contacting face 25 on leg 22a and the like work-contacting face or faces on the other leg or legs of the same group should lie in a common plane perpendicular to the vertical axis of central platform 15.

At the opposite or right-hand end of gauge 1 is a plurality of like legs 28a and 28b, similar in shape and number to those at the left-hand end, such legs 28a and 28b being jointed at the crotch by a shallow yoke 29 formed integrally with intermediate edge portion 18 of central platform 15. At their ends, legs 28a and 28b are characterized by depending work-contacting portions, 30a and 30b, of elongated shape. Work-contacting portion 30a has a plane work-contacting face 31 that appears in Figure 2. Leg 28b, which does not appear in Figure 2, has a similar work-contacting face. The two work-contacting faces lie in a common plane perpendicular to the vertical axis of central platform 15 which plane forms a continuation of the plane containing the two like work-contacting faces on the legs 22a and 22b at the opposite end of the gauge.

Beneath leg 28a is formed a recess or relieved portion 32 and a similar recess or relieved portion underlies leg 28b, the two merging with each other under crotch 29 and central platform 15. The end portions of legs 28a and 28b are smoothly faired, as shown at 33a and 33b. Angle b between legs 28a and 28b is equal to and opposite angle a between legs 22a and 22b. Angle c, which lies between them on the far side of the gauge, is of the order of about 150° in the embodiment of the invention shown in Figures 2 and 3, as is also the undesignated opposite angle on the near side of the gauge. Angle c and its counterpart on the near side of the gauge may, however be more or less than 150°, even as little as or less than 90°.

Thus in its preferred form the gauge of the invention is characterized by opposed groups of sharply-diverging work-contacting legs, each group having at least two such legs. Ordinarily, therefore, the gauge will have an even number of legs; i. e., four or six, although it is of course possible to provide the gauge with an odd number of legs; i. e., three or five, spaced by equal or unequal angular distances from each other. A relieved portion preferably underlies the legs and platform, making it possible to exclude errors that tend to be introduced by localized warping near the center of the engine block. Near their ends, the legs of the gauge have accurately machined work-contacting faces all of which lie in a common plane. The fact that the work-contacting faces are accurately machined and lie in such common plane gives the gauge additional usefulness as a surface plate, as well as an averaging level in the sense that where general warpage is present it indicates the mean of surfaces tangential to the surface to be provided by the regrinding operation.

The width of the work-contacting face preferably is in each case but a minor fractional part of the length, so that each of the work-contacting faces is several times as long as it is wide. An advantage of making work-contacting portions 24a, 24b and 30a, 30b of elongate form is that the latter lends itself to contact at widely spaced points with the peripheral edges of the engine block without requiring the use of different gauges for engine blocks of different lengths. However, an elongated form is not strictly necessary and another shape, such as a circular shape, could if desired be imparted to the work-contacting portions of the legs of each group.

In a typical case, the gauge will have an overall ratio of length to breadth of about three to one.

Narrowing angles a and b and increasing angle c will of course increase the ratio; similarly, widening angles a and b and decreasing angle c will decrease the ratio. Preferably the gauge, if intended for use on engine blocks of kinds now more or less standard, will have an overall length of about 18 inches and an overall width of 6 inches. In such case, the central platform may conveniently measure about 4½ inches in diameter and have a thickness of about one inch. If the work-contacting faces on legs 22a, 22b and 28a, 28b are of areas which individually measure between three and four square inches, abundant surface for contact with widely spaced points along the peripheral edge portions of the engine block will be provided. The accuracy of the gauge depends in part on the length of the legs of the gauge, although accuracy of the levels is of course an important factor.

There need not be two spirit levels, but might be one two-dimensional level or a plumb bob or any other means to indicate the plane the work surface is resting in. If desired, these levels may be adjustable. The work can be leveled to a plane parallel to a plane tangential to the earth's surface at a point directly below the center of the leveling gauge or it may be leveled to a plane parallel to the plane through which the grinding wheel reciprocates. These two reference planes may or may not be parallel, depending upon whether or not the machine is level.

When, as illustrated in Figure 1, gauge 1 is applied to an engine block 2 mounted on the work table 3 of a grinding machine, spirit levels 19 and 20 will indicate whether or not the engine block is level. If spirit level 19 indicates that one of the two ends is higher than the other, appropriate adjustments may be made by means of the slides in frame 14 or the studs 8 on the work-locating lugs 6 at the ends of work table 3. If spirit level 20 indicates that one side is higher than the other, appropriate adjustments may be made by angling mounting assemblies 9 on the jack shafts within shaft housings 13 or by adjusting studs 8 on the near side or far side, as the case may be, of work table 3. Localized warping at the center of the engine block introduces no error, this because of the recesses or relieved portions that overlie the center of the engine block. Even if there is localized warping affecting part only of the periphery of the engine block, accurate results may often be obtained by eliminating such warping as a factor, which can sometimes be done by angling the gauge to provide three-way contact with the engine block.

It is intended that the patent shall cover, by summarization in the appended claim, all features of patentable novelty that may reside in the invention.

What is claimed is:

A split-end flatness gauge for engine blocks, cylinder heads and other like objects characterized by a susceptibility to localized warping comprising a shallow central platform taking the form of a solid cylinder having a flat upper face portion, a flat lower face portion and an intermediate edge portion; a level mounted within the lateral limits of the flat upper face portion of the platform; and, integral with and extending laterally from the platform, two shallow yokes projecting outwardly to form two opposed pairs of sharply-diverging work-contacting legs relieved toward their inner ends so as to provide them near their extremities with longitudinally extending work-contacting faces each of which is flat and all of which lie in a common plane below the level of the flat lower face portion of the platform, the two pairs of work-contacting legs being spaced from each other along the sides of the gauge by substantially more than ninety degrees and the legs of each pair being spaced from each other along the ends of the gauge by substantially less than ninety degrees so that the overall ratio of length to breadth is about the same as that of the engine block, cylinder head or other like object on which the gauge is to be used.

JAMES J. STRNAD.

REFERENCES CITED

The following references are of record in the file of this patent:

UNITED STATES PATENTS

| Number | Name | Date |
|---|---|---|
| 813,003 | Horsfall | Feb. 20, 1906 |
| 1,853,558 | Fullman | Apr. 12, 1932 |
| 2,292,968 | Peters | Aug. 11, 1942 |